(12) United States Patent  
Contractor

(10) Patent No.: US 6,683,940 B2  
(45) Date of Patent: Jan. 27, 2004

(54) TRANSFERRING VOICE MAIL MESSAGES TO A DATA NETWORK

(76) Inventor: Sunil H. Contractor, 2069 Planters Mill La., Marietta, GA (US) 30062

( * ) Notice: Subject to any disclaimer, the term of this patent is extended or adjusted under 35 U.S.C. 154(b) by 0 days.

(21) Appl. No.: 09/996,269

(22) Filed: Nov. 28, 2001

(65) Prior Publication Data

US 2003/0099334 A1 May 29, 2003

(51) Int. Cl.[7] ............................................... H04M 1/64
(52) U.S. Cl. ................ 379/88.17; 379/67.1; 379/88.13; 379/100.08
(58) Field of Search ........................... 379/88.13, 88.14, 379/88.17, 221.09, 100.08; 709/206; 704/235

(56) References Cited

U.S. PATENT DOCUMENTS

| | | | | |
|---|---|---|---|---|
| 5,572,583 A | * | 11/1996 | Wheeler, Jr. et al. | 379/207 |
| 5,987,508 A | * | 11/1999 | Agraharam et al. | 709/217 |
| 6,069,890 A | * | 5/2000 | White et al. | 370/352 |
| 6,085,231 A | * | 7/2000 | Agraharam et al. | 709/206 |
| 6,215,858 B1 | * | 4/2001 | Bartholomew et al. | 379/88.17 |
| 6,233,318 B1 | * | 5/2001 | Picard et al. | 379/88.17 |

* cited by examiner

*Primary Examiner*—Fan Tsang  
*Assistant Examiner*—Olisa Anwah  
(74) *Attorney, Agent, or Firm*—Woodcock Washburn LLP

(57) ABSTRACT

The invention contemplates a device, system, and method of transferring a voice mail message. The inventive method includes receiving a voice mail message directed to a telephone number, correlating the telephone number to at least one email address, and forwarding the voice mail message to the email address. The method further may include converting the voice mail message to an electronic data file, like a text file and/or audio file, for example. Also, the electronic data file may provide a name of a party initiating the voice mail message, a telephone number of a party initiating the voice mail message, a time and a date of the voice mail message, and/or a duration of the voice mail message, for example. The inventive method may further include storing the voice mail message on a computer-readable medium associated with the email address.

39 Claims, 6 Drawing Sheets

TRANSFERRING VOICE MAIL MESSAGES TO A DATA NETWORK

TECHNICAL FIELD

The invention relates generally to telecommunication systems and services, and more particularly to transferring a voice mail to a data network.

BACKGROUND OF THE INVENTION

In the past, voice mail systems provided a convenient way of asking someone to return a missed call. Today, perhaps due to the expectations brought about by its counterpart email system, the voice mail system has become more than a way of communicating brief "return-call" messages with others. For many, voice mail systems have become an extension of their other electronic tools. For example, many use their voice mail systems like a data storage system to store important voice messages, much like one would store an email for a longer period of time or a memorandum in a paper-based file.

Many legacy voice mail systems, however, are ill equipped to provide anything more than very short-term data storage. In fact, legacy voice mail systems often have relatively small storage capabilities that were designed for the more elementary purposes of days past. As companies add personnel, these older systems necessarily reduce the number of messages that may be stored for each employee. Moreover, these legacy systems often are impossible or too expensive to upgrade. As a result, a caller often will be frustrated by hearing the dead end message "I'm sorry mailbox 4321 is full, and unable to receive additional messages." The owner of the mailbox also may be frustrated by being forced to delete certain voice mail messages that should continue to be stored, or perhaps to have the voice mail message manually typed into text for storage on a computer medium.

In addition to its limited storage capabilities, legacy voice mail systems do not provide the ability to intelligently categorize, sort, and/or search the stored messages (e.g. by titles, times, types, parties), like its email counterpart. Again, in part because voice mail systems are being used for purposes beyond their originally intended purposes, they do not provide a means of intelligently interacting with the data that they capture. For example, although most traditional voice mail systems are capable of capturing the name and number of the calling party, the time and date of the incoming call, and the duration of the voice mail message, none of these attributes are available for anything other than a simple audible report to the voice mail user. Yet, sorting and searching these attributes are critical in permitting the data captured by the voice mail system to be useful in today's communications environment. Although newer voice mail systems may provide some of these capabilities, many are not willing to undergo the aggravation and expense of a wholesale transfer to these newer systems, especially organizations with a large number of users.

Therefore, there is a need to provide a technique for transferring voice mail messages to other data communication systems, like email for example.

SUMMARY OF THE INVENTION

The invention contemplates a device, system, and method of transferring a voice mail message. The inventive method includes receiving a voice mail message directed to a telephone number, correlating the telephone number to at least one email address, and forwarding the voice mail message to the email address. The method further may include converting the voice mail message to an electronic data file, like a text file and/or audio file, for example. The electronic data file may be an instant message, an Internet relay chat message, a desktop icon, a hypertext markup language link, and/or an electronic file with a directory mapping, for example. Also, the electronic data file may provide a name of a party initiating the voice mail message, a telephone number of a party initiating the voice mail message, a time and a date of the voice mail message, and/or a duration of the voice mail message, for example. The inventive method may further include storing the voice mail message on a computer-readable medium associated with the email address.

Another inventive method contemplated by the invention includes retrieving a voice mail message from a voice mailbox, forwarding the voice mail message to an email system, and receiving a data file via the email system, wherein the data file is representative of the voice mail message. The inventive method further may include accessing the voice mailbox, for example, using an alphanumeric password. The inventive method may further include selecting an option that conducts the forwarding of the voice mail, for example, by depressing a key on a telephone keypad, depressing a key on a computer keyboard, and/or providing an audible command. The method may identify at least one email address on the email system to be correlated with the voice mailbox, and may select an email address from a plurality of identified email addresses.

The invention also contemplates a method of transferring a voice mail message to an email system by providing access to a voice mail associated with a telephone number, prompting for a transfer of the voice mail to an email system, and transferring the voice mail to the email system. Also, the inventive method may convert the voice mail to an email, prompt for at least one email address associated with the telephone number, and/or store the voice mail message on a computer-readable medium associated with the email system.

Another inventive method contemplated by the invention includes receiving a voice mail message that is associated with an identifier (e.g., a telephone number, a private branch exchange number, a subscriber name), converting the voice mail message to a data file, correlating the identifier to a network address, and forwarding the data file to the network address. The method may include receiving at least one network address associated with the identifier, and storing the data file on a computer-readable medium associated with the network address. The method may include providing access to the voice mail message, for example, using an alphanumeric password. The network address may be an email address, an Internet relay chat address, an Internet protocol address, and/or a telephone number, for example.

The inventive device for converting a voice mail includes an input for receiving a voice mail associated with an identifier, a converter in communication with the input for converting the voice mail to a data file, and a database for correlating one or more network addresses with the identifier. The device further includes a computing device in communication with the converter and the database. The computing device queries the database to identify a network address associated with the identifier. The inventive device also includes an output for providing the data file to a network address. The identifier may be a telephone number, a private branch exchange number, and a subscriber name, for example. Also, the network address may be an email address, an Internet relay chat address, an Internet protocol address, and a telephone number. The data file may be sent as an instant message, or an Internet relay chat message, a desktop icon, a hypertext markup language link, and an electronic file with a directory mapping. The data file also may be an audible representation of the voice mail message. The data file may include data pertaining to a name of a party initiating the voice mail message, a telephone number of a party initiating the voice mail message, a time and a date of the voice mail message, and a duration of the voice mail message, for example.

The invention contemplates a system for transferring a voice mail message. The system includes a voice mail system having a voice mailbox for voice mail messages. The system also includes a service control point in communication with the voice mailbox. The service control point prompts a customer to transfer a voice mail. The inventive system also includes a gateway in communication with the service control point. The gateway correlates the voice mailbox to a network identifier. The service control point transfers the voice mail message to the network identifier. The gateway may be a computer telephony interface that converts the voice mail message to a data file. The system also may include a service switching point in communication with the service control point and in communication with a data network. The service switching point may operate to forward the voice mail message to a network device having the network identifier on the data network.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

Figure 1:
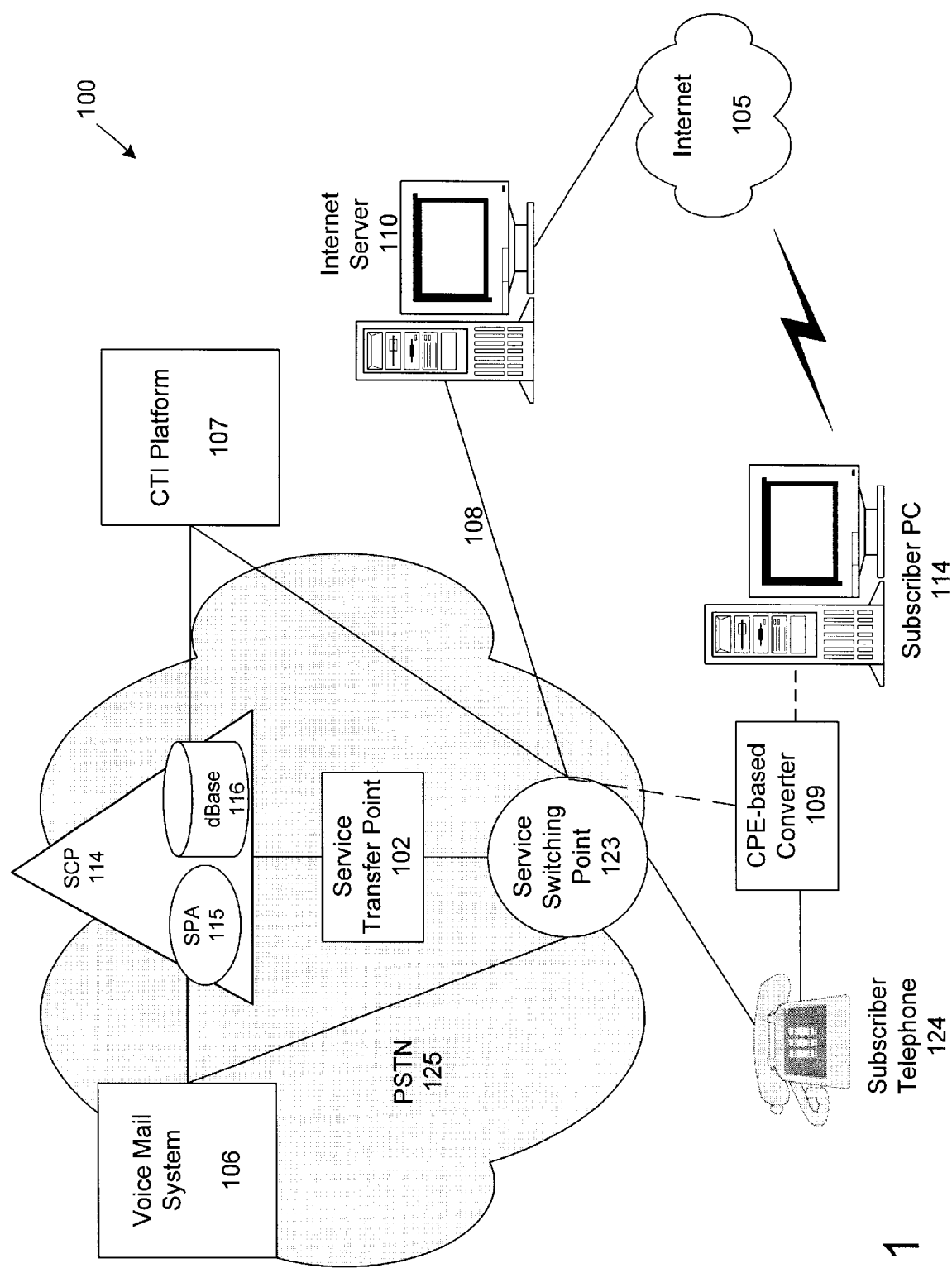
FIG. 1 is a block diagram a telecommunications network, according to the invention.

FIG. 1 is a block diagram of a data network 100 that provides communication to a subscriber via a public switched telecommunication network (PSTN) 125 and an Internet 105. It should be appreciated that the term "communication" is used to include all data transmissions that may be exchanged between a subscriber, for example, and other network terminations. The relevant portion of PSTN 125 is shown as part of an Advanced Intelligent Network (AIN) of a typical local exchange carrier. For brevity, only a basic explanation of the AIN-based PSTN is provided herein. Where PSTN 125 operates or is composed differently in an important aspect from that which would be understood by those skilled in the art, additional details are provided. For further information regarding PSTNs in general and their AIN aspects, the interested reader is referred to U.S. Pat. No. 5,430,719, to Weisser, entitled "Mediation of Open Advanced Intelligent Network Interface by Shared Execution Environment," and is incorporated herein by reference.

As shown in FIG. 1, PSTN 125 includes at least two different types of switching points: a Service Switching Point (SSP) 123 and a Service Control Point (SCP) 114. SSP 123 is a central switch that serves a designated group of subscriber lines and thus acts as the hub of operations for PSTN 125. Although a PSTN may have a plurality of SSPs each connected to each other with trunk circuits and each serving vast regions of the PSTN, for the purpose of simplicity FIG. 1 illustrates just one SSP. SSP 123 is coupled to a subscriber telephone 124 via a subscriber line. A subscriber line may also be referred to as a "calling line." SSP 123 is further in communication with Internet server 110 over line 108. Internet server 110 is in communication with subscriber PC 114. For the purposes of simplicity and brevity, line 108 may be referred to as the "data network" to distinguish it from a discussion of PSTN 125, although it should be appreciated that in practice a data network may be a part of or the same as the PSTN.

Each calling line typically is connected to terminating equipment. Terminating equipment may include a telephone, a personal computer, and/or a computer server, for example. Although not shown, those skilled in the art will appreciate that such terminating equipment may include other communication devices, including facsimile machines and modems, for example. As shown in FIG. 1, a subscriber may access data network 100 using either subscriber telephone 124 or subscriber PC 114. Although a single calling line is shown connecting subscriber telephone 124 to data network 100, it should be appreciated that the subscriber may have a plurality of calling lines connected to PSTN 125. Each calling line is assigned a ten-digit "directory number" (DN). Therefore, the term "directory number" is used to describe the number that is dialed or input by a caller or source to reach certain terminating equipment. A DN is commonly referred to as a "telephone number" or "calling line number."

SSP 123 is further coupled to SCP 114. SCP 114 contains control logic and service-specific feature data, and is a centralized node in PSTN 125. Much of the intelligence behind the enhanced features of the AIN-based PSTN 125 resides in SCP 114, which typically is a computer-based device. SCP 114 also includes one or more subscriber databases 116. Alternatively, although subscriber database 116 is shown in SCP 114, it should be appreciated that subscriber database 116 may be located anywhere within system 100, including within a voice mail system 106. Subscriber database 116 may identify particular customers and their subscribed services. Typically, SCP 114 is a repository of many service package applications (SPAs) 115, each associated with a particular service or enhanced feature available to customers (e.g., "800" SPA). In particular, SPA 115 is a program that queries database 116 and provides instructions to SSP 123 for how to direct incoming calls, based on a look-up in database 116. Therefore, for example, when a subscriber enters certain service-specific digits (e.g., *69—"Call Return"), SPA 115 will conduct a look-up in database 115 to ensure that the subscriber has access to the requested service. If the look-up confirms the subscriber's access to the requested service, SPA 115 will direct SSP 123 to route the call accordingly.

Communication between SSP 123 and SCP 114 typically employs a Common Channel Signaling System No. 7 protocol or "SS7", well known to those skilled in the art. SS7 defines the procedures and protocol by which network elements in PSTN 125 exchange information over a digital signaling network to effect wireless and wireline call setup, routing and control. SS7 communication between SSP 123 and SCP 114 typically occurs over 56 or 64 kilobit per second (kbps) bi-directional channels called "signaling links." Signaling occurs "out-of-band" on dedicated channels rather than "in-band" on voice channels.

Within SSP 123 are defined a relatively small set of termination attempt triggers (TAT or trigger). A trigger is an event associated to a particular subscriber line that generates a signal to be sent to SCP 114. Triggers may be established both for incoming calls directed to the subscriber and for outgoing calls initiated by the subscriber. For example, if the subscriber enters a certain sequence of numbers in addition to a called number, SCP 114 will interpret the significance of the sequence and set a trigger on SSP 123. SCP 114 may then direct SSP 123 to route the call to the called number. When an incoming call from a caller, for example, is made to subscriber telephone 124, the trigger will be activated. Activating the trigger causes a signal to be sent to SCP 114. In response to the signal, SPA 115 in SCP 114 queries database 116 for processing instructions. The results of database 116 inquiry by SCP 114 are sent back to SSP 123 in the form of commands that instruct SSP 123 on how to process the call. The instructions may be to take some special action as a result of a customized calling service or enhanced feature available to the subscriber. In response, SSP 123 routes the call in accordance with the instructions.

In AIN-based PSTN 125, SSP 123 also may be coupled to an intelligent peripheral (IP). The term "intelligent peripheral" is used to refer to an AIN device that terminates an ISDN interface to an AIN Switching System. Functionally, an IP provides information to a subscriber and/or collects information from the subscriber via a circuit-switched bearer connection. The IP is dedicated to perform certain intelligent processes, including for example, voice and dual tone multi-frequency (DTMF) signal recognition, voice recognition, and messaging services.

Voice mail system 106 and computer telephone integration (CTI) platform 107 may be two examples of such an IP that are relevant to the invention. As will be discussed in greater detail, voice mail system 106 provides network-based voice mail services well known to those skilled in the art. Also, CTI platform 107 represents any of a number of systems that enable a computer-based device to operate like a call center to accept and route incoming calls to the appropriate device or person. For example, CTI platform may be sophisticated enough to handle all sorts of incoming and outgoing communications, including phone calls, faxes, and Internet messages. In the context of the invention, CTI platform 107 may operate to correlate a subscriber's directory number with one or more other network addresses (e.g., email address, Internet relay chat address, Internet protocol address, telephone number). Also, CTI platform 107 may have certain computer-executable instructions capable of permitting CTI platform 107 to interface with voice mail system 106, so as to convert the audio files stored in voice mail system 106 (representing the voice messages left for a particular subscriber) to other audio file formats form transmission to the other network addresses (e.g., an email address). Voice mail system 106 and CTI platform 107 may be connected to SCP 114, to SSP 123, or to both SCP 114 and SSP 123, as shown in FIG. 1. Also, the functionality of voice mail system 106 and CTI platform 107 may exist in other components in system 100.

A customer premise equipment (CPE)-based converter 109 also is shown in FIG. 1. CPE-based converter 109 is in communication with subscriber telephone 124, and may be located within the subscriber's residence next to, or integrated with, subscriber telephone 124, for example. Also, CPE-based converter 109 may be in communication with subscriber PC 114 and/or SSP 123. Because the connections of CPE-based converter 109 with subscriber PC 114 and SSP 123 are optional they are shown dashed in FIG. 1. As will be discussed with reference to FIG. 6, CPE-based converter 109 operates to store voice mail messages located in voice mail system 106 on subscriber PC 114. In so doing, CPE-based converter 109 may act to convert the audio files stored in voice mail system 106 to different audio file formats compatible with the software resident on subscriber PC 114. For example, CPE-based converter 109 may convert the audio files on voice mail system 106 to .wav files. Also, CPE-based converter 109 may act to correlate the DN for subscriber telephone 124 with the Internet protocol address or email address accessed by subscriber PC 114, for example.

There are two main ways for a subscriber to access AIN-based PSTN 125: (1) via subscriber PC 114, and/or (2) via subscriber telephone 124. First, the subscriber may enter the Internet service provider's DN using subscriber PC 114. The DN is carried over a subscriber line using a point-to-point protocol (PPP), for example, well known to those in the art. Subscriber PC 114 connects to Internet server 110 located with the Internet service provider, allowing the subscriber to access Internet 105.

Second, the subscriber may enter a particular DN using subscriber telephone 124. For example, the subscriber may dial a DN or a sequence of numbers representing voice mail system 106, so as to gain access to the subscriber voice mailbox. SCP 114 simply instructs SSP 123 to connect subscriber 101 to the desired DN over the subscriber line. Once the connection is made, SCP 114 interprets the requests made by the subscriber (via alphanumeric keypad entries) to properly listen to and/or handle the received voice mail entry. For example, voice mail system 106 may indicate that the subscriber has a number of "unheard" voice mail messages. After listening to the voice mail messages, the subscriber may enter certain alphanumeric entries indicating that the voice mail message should be saved, deleted, and/or forwarded, for example.

Figure 2:
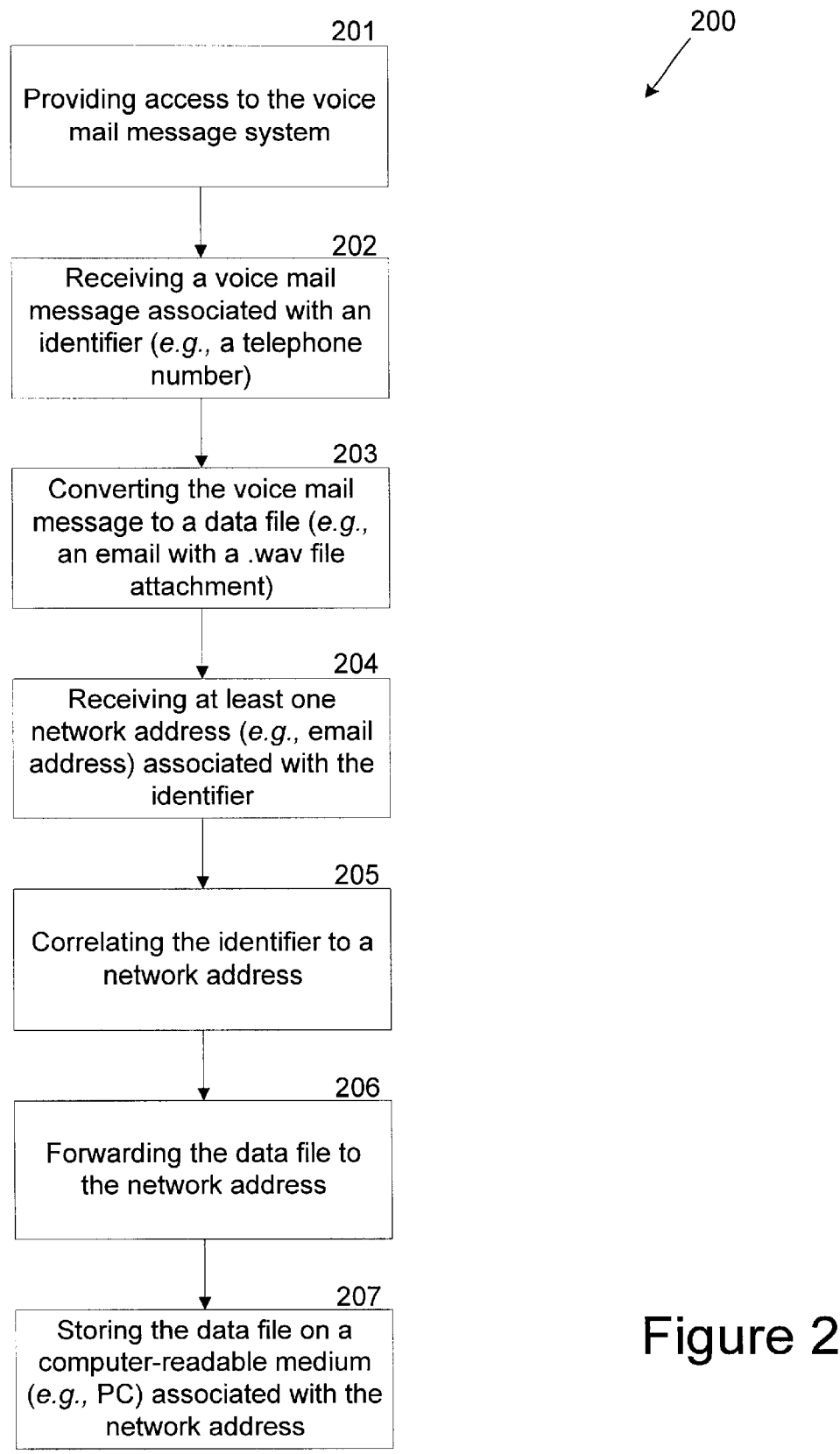
FIG. 2 is a flow diagram of a method for transferring a voice mail message, according to the invention.

FIG. 2 is a flow diagram of a method 200 for transferring a voice mail message. In step 201, a subscriber using, for example, subscriber telephone 124 accesses voice mail system 106. Such access may be accomplished, for example, using an alphanumeric user name and password. In step 202, the subscriber receives a voice mail message associated with subscriber telephone 124. The voice mail message may be stored in the voice mail system 106, and played by the subscriber by entering certain alphanumeric keys on subscriber telephone 124. Therefore, when the subscriber accesses voice mail system 106, the voice mail message associated with subscriber telephone 124 permits the subscriber to retrieve voice mails associated with an identifier, like the telephone number of subscriber telephone 124.

In step 203, the voice mail received in step 202 is converted to a data file having a certain file format. For example, if the voice mail system 106 is legacy system that stores the individual voice messages in a certain proprietary file type, method 200 acts to convert that proprietary file type to a different audio file format. For example, the audio file may be converted to a .wav file format, well known by those skilled in the art. The file created in step 203 is capable of being transmitted over a communication system, like the Internet. Therefore, in one embodiment for example, following step 203, a .wav file may be an attachment to an email message. In addition, the voice mail message may be converted to a text-based file and transmitted to subscribe PC as a text file, for example, in the body of or as an attachment to an email. In any event, it should be appreciated that the electronic data file is not limited to its form or format, but may include without exclusivity an instant message, an Internet relay chat message, a desktop icon, a hypertext markup language link, and/or an electronic file with a directory mapping. Also, it should be appreciated that the data file may include information other than the content of the voice message including without exclusivity a name of a party initiating the voice mail message, a telephone number of a party initiating the voice mail message, a time and a date of the voice mail message, and/or a duration of the voice mail message.

In step 204, at least one network address associated with the telephone number is received. The network address may be different than the telephone number associated with subscriber telephone 124, but still represent a network address that is identified with or owned by the subscriber. For example, the network address may be an Internet protocol address or email address assigned to subscriber PC 114. The network address received in step 204 may be transmitted by CTI platform 107, upon request of voice mail system 106. For example, when the subscriber communicates to voice mail system 106 (using keypad entry on subscriber telephone 124) that a certain voice mail message is to be directed to another network address, voice mail system 106 may request CTI platform 107 to provide the other network address. Such network addresses may have been provided by the subscriber and stored in CTI platform 107 at an earlier date. In any case, the network address is received by voice mail system 106. Alternatively, the network address received in step 204 may be transmitted by the subscriber using subscriber telephone 124 at the time the subscriber identifies a certain message to be so forwarded. For example, the subscriber may use subscriber telephone 124 to enter an Internet protocol address assigned to subscriber PC 114, upon request of voice mail system 106. Regardless of the above example, it should be appreciated that the network address may be received at a location other than voice mail system 106. Also, it should be appreciated that the network address may be transmitted by any device located within the telecommunications system, other than subscriber telephone 124 and CTI platform 107.

In step 205, the network address received in step 204 is correlated with the identifier. For example, where the other network address is an email address, it will be correlated with the telephone number assigned to subscriber telephone 124. Such correlation may take place automatically based on the number owned by subscriber telephone 124 and the network address entered by the subscriber. For example, voice mail system 106 automatically may be able to identify the telephone number assigned to subscriber telephone 124 via SCP 114. Therefore, if CTI platform 107 is capable of communicating with voice mail system 106, voice mail system 106 may transmit the telephone number to CTI platform 107. CTI platform 107 may operate to correlate the received telephone number with the other network address (e.g., email address) previously identified. CTI platform 107 may forward the other network address to voice mail system 106.

In step 206, the data file created in step 203 is forwarded to the network address correlated in step 205. For example, voice mail system 106 or CTI platform 107 may transmit a .wav file to subscriber PC 114 via PSTN 125 and Internet 105. In step 207, the data file may be stored on a computer-readable medium that is associated with the network address. For example, the data file may be transmitted from PSTN 125 to subscriber's PC 114 via Internet server 110 and Internet 105. In this way, therefore, a subscriber is permitted to store a received voice mail on a subscriber PC 114. As a result, the subscriber may be able to save and/or categorize the voice mail now in data format using subscriber PC 114. For example, such categorization may be similar to the sorting and categorization of received emails using a typical email application, like Microsoft's Outlook™.

Figure 3:
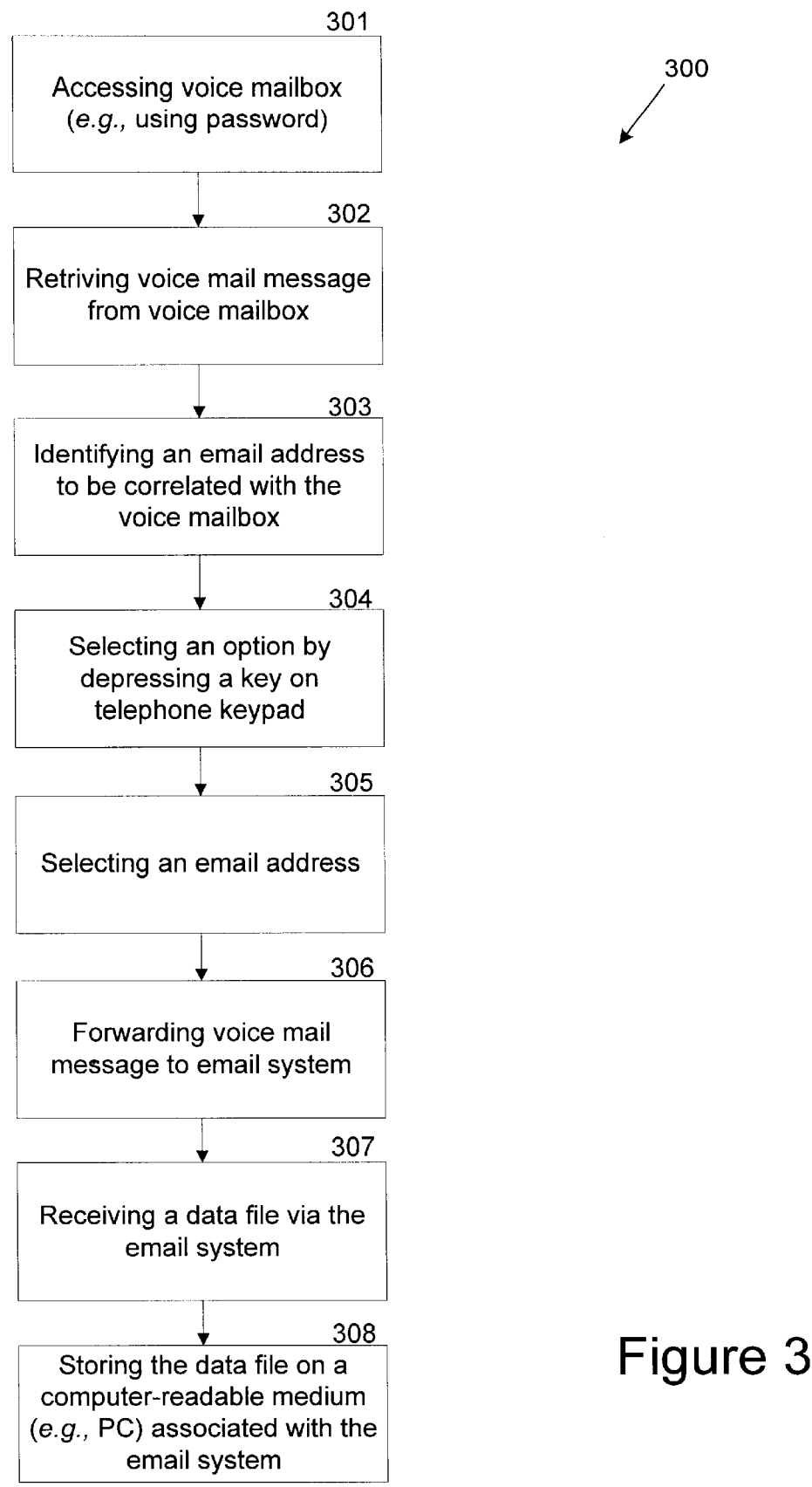
FIG. 3 is a flow diagram of a method for transferring a voice mail message, according to the invention.

FIG. 3 is another method 300 for transferring a voice mail message to an email system. In particular, method 300 describes how a subscriber may accomplish transferring a voice mail message to an email system. In step 301, the subscriber accesses the voice mail system 106 and gains access to the dedicated voice mail using, for example, a password. In step 302, the subscriber retrieves the voice mail message from the voice mailbox and perhaps listens to the voice mail message as it is played by voice mail system 106. Retrieving and listening to the voice mail message may be initiated by the subscriber by entering certain alphanumeric entries, as required by voice mail system 106.

In step 303, the subscriber may be prompted to identify one or more email addresses to be correlated with a voice mailbox to which the subscriber has gained access. Therefore, the user having gained access to a particular voice mail box to which the telephone number of subscriber telephone 124 is assigned, may be prompted to identify one or more email addresses that should be associated with that voice mail box. Such identification of one or more email addresses may take place during a "setup" of the subscriber's account on the system. Alternatively, identification of the email addresses may be accomplished during the subscriber's retrieval and forwarding of a particular voice message.

In step 304, the user selects an option that identifies to voice mail system 106 that the subscriber wishes to forward the recently played voice mail message to an email. Such selection may take place, for example, by depressing a key on subscriber telephone 124 in response to a specific prompt by voice mail system 106. For example, voice mail system may prompt the subscriber to "select '1' if you wish to delete the voice mail message, select '2' if you wish to save the voice mail message in the voice mail system, and select '3' if you wish to forward the voice mail message to an email address." Therefore, voice mail system 106 may be programmed to request such information and to proceed accordingly upon receiving the proper response. Also, it should be appreciated that such prompting and processing may be conducted by other components within the telecommunications system, including for example, CTI platform 107.

In step 305, the user may be prompted to select one or more email addresses from a list of available email addresses previously identified in step 303. Again, such prompting may be accomplished by voice mail system 106 or other components in the telecommunications system, including CTI platform 107. Therefore, step 305 may not be required where one email address has been identified. As a result of the prompts and responses entered by the subscriber, in step 306, voice mail system 106 forwards the voice mail message (e.g., in the form of an electronic data file) to an email system. Referring to FIG. 1, voice mail system 106 may transmit the data file to the email system represented by Internet server 110, Internet 105, and subscriber PC 114, all via PSTN 125 and its components.

In step 307, the subscriber receives the data file at to subscriber PC 114 via the email system represented by Internet server 110 and Internet 105. The data file may appear on subscriber's PC 114 as an email on an email application. Also, the data file may appear on subscriber's PC as a desktop icon, a text message or any other type of visual and/or sound prompt indicating that a data file representing a voice mail has been received. In step 308, the subscriber, using subscriber PC 114, may store the data file on the computer-readable medium of subscriber PC 114. In addition, depending upon the particular application that processes the data file, the subscriber may categorize, sort, and/or organize the received data file with other data files including non-voice mail files like traditional email files. In this way, the user may have a central repository for viewing, sorting, and/or organizing traditional emails and the data file representing a voice mail that has been converted to an email type message.

Figure 4:
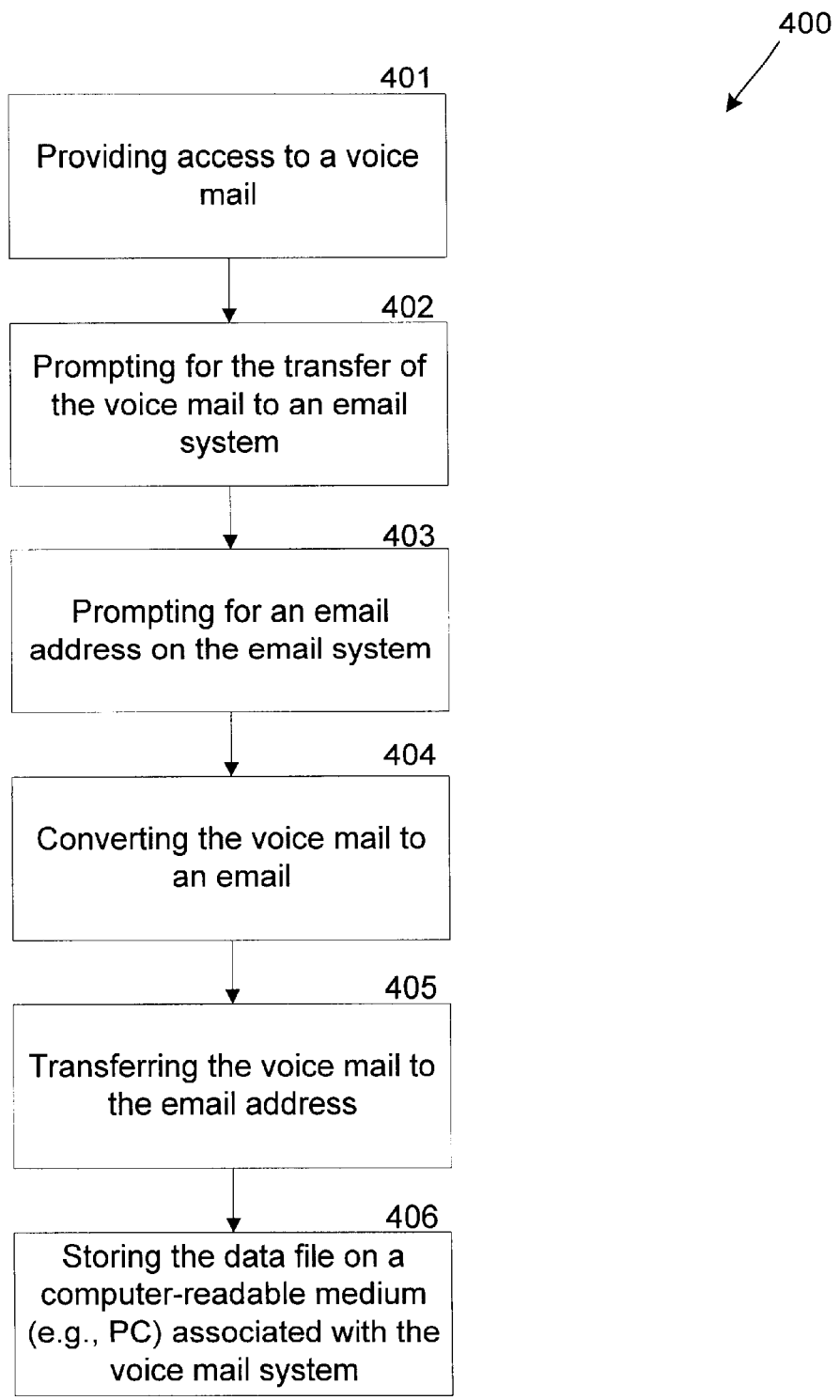
FIG. 4 is a flow diagram of a method for transferring a voice mail message, according to the invention.

FIG. 4 provides a method 400 for transferring a voice mail message to an email system. In particular, method 400 describes how a service provider may provide for a method of transferring a voice mail message to an email system. In step 401, the service provider provides access to a voice mail system. Such access may be provided by the service provider to a subscriber by requiring the subscriber to establish a voice mailbox account in the voice mail system, for which the provider receives a certain subscription fee. In step 402, the service provider prompts the subscriber for the transfer of a particular voice mail to an email system. Such a prompt may be conducted by playing a message to the subscriber. The message may ask the subscriber to respond by depressing certain keys on the keypad of subscriber telephone 124 so as to transfer the voice mail message to the email system.

In step 403, the service provider may then prompt the user to identify a particular email address on the email system to which the voice mail should be transferred. Again, such prompting may occur by a request for the email address. The subscriber may enter the email address through a series of keys on subscriber telephone 124. Once the service provider has received indication that the subscriber wishes to transfer the voice mail system to an identified email address, in step 404, the service provider may convert the voice mail message to an email compatible message. For example, where the voice mail message is a proprietary sound file, the service provider may ask to convert the file to a more standard sound file, like a .wav file. It should be appreciated, however, that converting the voice mail to a standard email file may not be necessary where voice mail system 106 already provides an acceptable file format.

In step 405, the service provider transfers the voice mail to the email address identified in step 403. Alternatively, or in addition, in step 406 the service provider may store the file on a computer-readable medium associated with voice mail system, for example, located within voice mail system 106. Such storage in a central repository may permit the subscriber to access the data file representation of the voice mail message without having to subsequently store the particular data file on subscriber PC 114.

Although method 400 was described in the context of a service provider providing for transfer of a voice mail message to an email system, it should be appreciated that the invention is not limited to a service provider. For example, method 400 applies to any entity that permits the transfer of a voice mail system to another communication system, like an email system. Furthermore, although method 400 was described in the context of a voice mail being transferred to an email system, it should be appreciated that the invention is not limited to email systems. For example, method 400 may include a transfer of a voice mail message to any type of data communication system, including but not limited to an email system.

Figure 5:
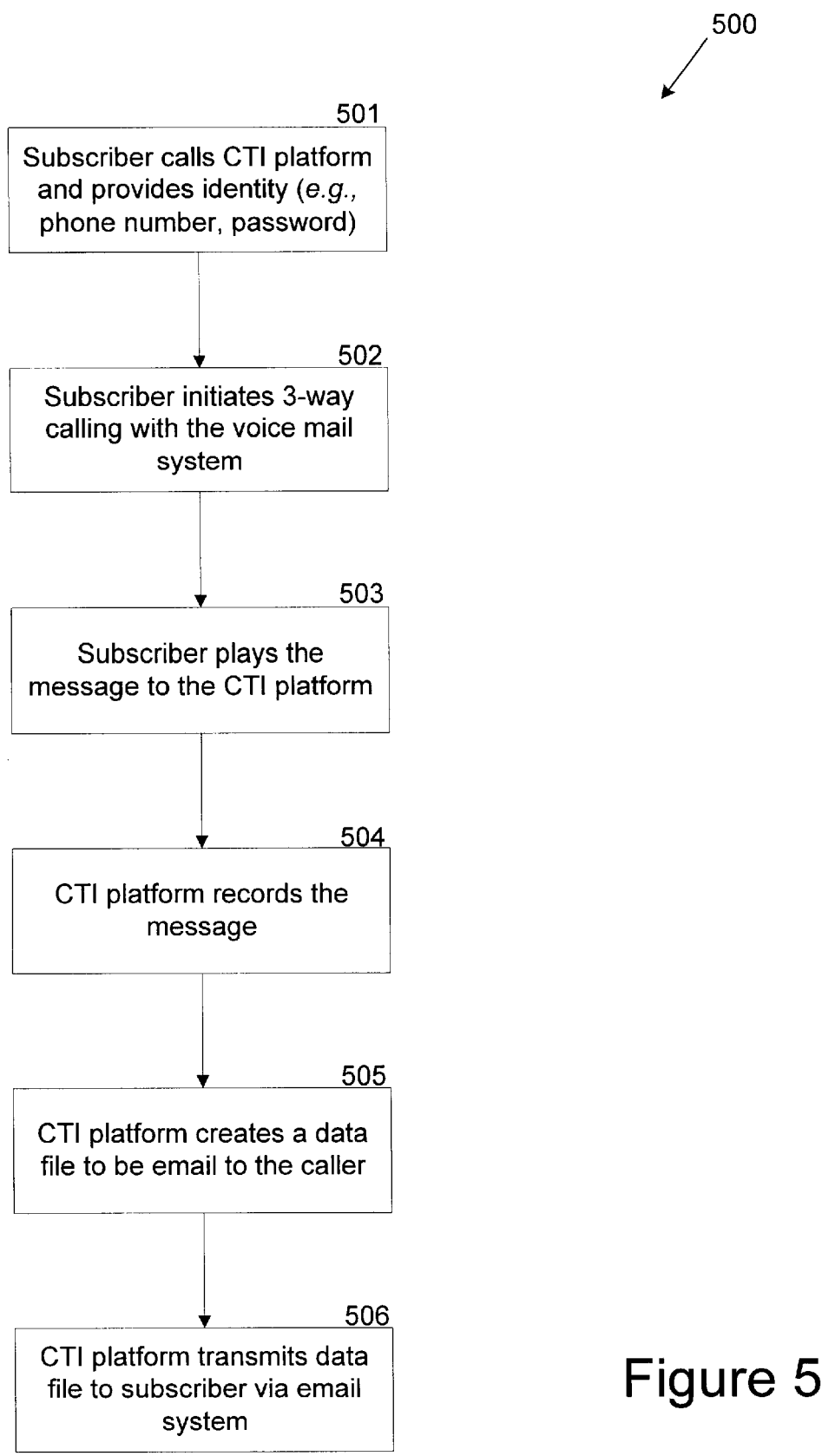
FIG. 5 is a flow diagram of a method for transferring a voice mail message, according to the invention.

FIG. 5 provides another method 500 for transferring a voice mail message. In particular, method 500 describes a technique for transferring a voice mail message where voice mail system 106 is not able to communicate and interact with CTI platform 107, or where is it not desired for CTI platform to be modified to do so. In particular, method 500 provides an alternative method of transferring a voice mail message where subscriber telephone 124 can communicate with both voice mail system 106 and CTI platform 107, but where voice mail system 106 and CTI platform 107 can not communicate with each other.

As shown in FIG. 5, in step 501, the subscriber establishes communication with CTI platform 107 by identifying the subscriber (e.g., via a telephone number and/or password). As discussed above, CTI platform 107 may be an IP device capable of having an assigned network identifier (i.e., telephone number, a private branch exchange number, a subscriber name) and capable of interacting with the subscriber using subscriber telephone 124. Once the subscriber establishes communication with CTI platform 107, in step 502 the subscriber also establishes communication with voice mail system 106. Such duel communication with CTI platform 107 and voice mail system 106 may be accomplished, for example, using a three-way calling technique, well known to those skilled in the art.

Once the three-way calling is established among subscriber telephone 124, CTI platform 107 and voice mail system 106, in step 503, the subscriber uses subscriber telephone 124 manipulates voice mail system 106 (as described above) to play the voice mail message that is stored in voice mail system. In addition, the subscriber uses subscriber telephone 124 to permit CTI platform 107 to hear and record the voice mail message over the three-way communication, in step 504. As a result, voice mail message is now received and stored as an audio file in CTI platform 107. In step 505, CTI platform 107 creates a file representing the recorded voice mail message. CTI platform 107 may operate to convert the data file to a text-based file and/or an audio file, for example. In step 506, CTI platform 107 transmits the data file to subscriber PC 114 via PSTN 125, Internet server 110 and Internet 105. The data file may be transmitted, for example, as an email and/or an attachment to an email, for example. Therefore, method 500 illustrates a method for allowing the data file (representing a voice mail message on voice mail system 106) to be transmitted to subscriber PC 114, even where CTI platform 107 and voice mail system 106 are not capable of communicating with each other directly.

Figure 6:
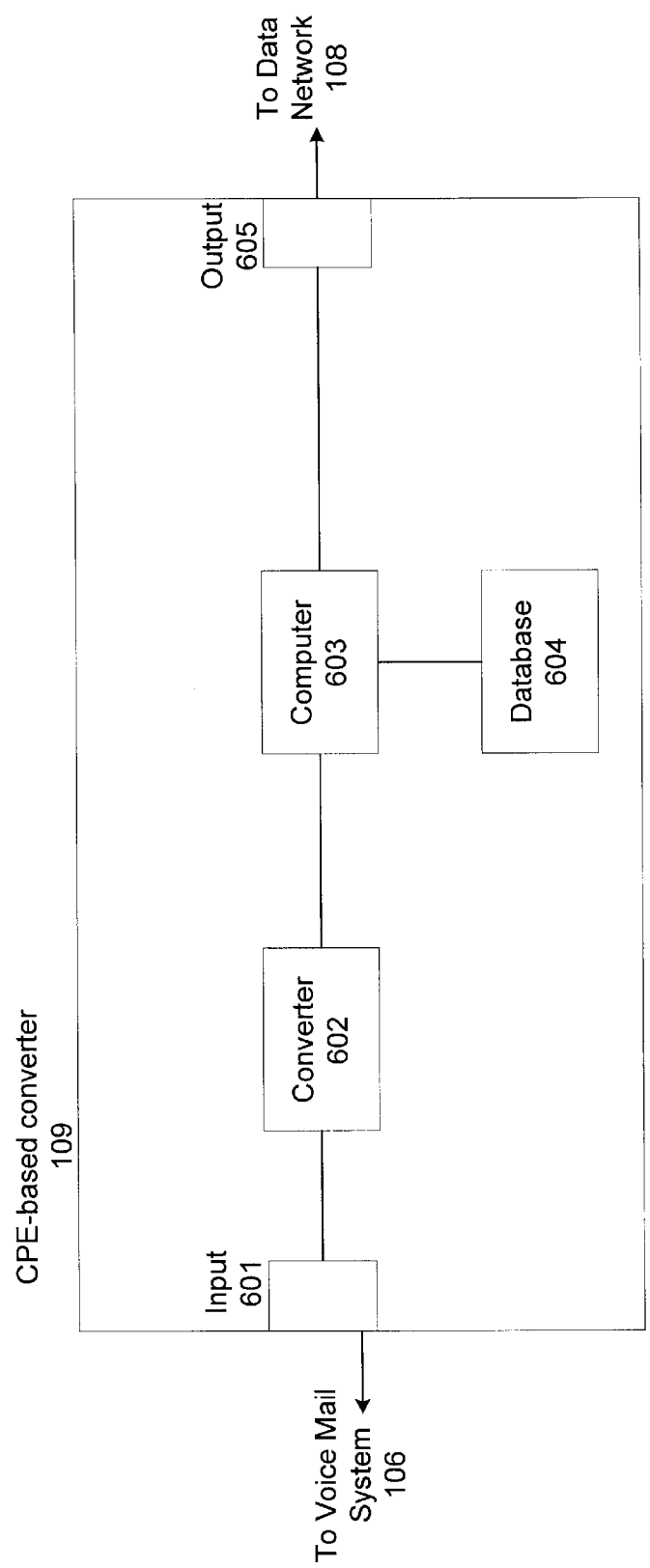
FIG. 6 is a block diagram of a CPE-based converter for transferring a voice mail message, according to the invention.

FIG. 6 is a block diagram of a CPE-based converter 109. As discussed, CPE-based converter operates to forward a voice mail message stored in voice mail system 106 to another network address on data network 108. CPE-based converter 109 may be a device that is located adjacent to, or integrated within, subscriber telephone 124.

As shown in FIG. 6, CPE-based converter 109 includes an input 601 that is in communication with voice mail system 106. CPE-based converter 109 also includes an output 605 that is in communication with data network 108. Alternatively, or in addition to, output 605 may be in direct communication with subscriber PC 114. Input 601 is in communication with a converter 602. Converter 602 is in communication with a database 604 via a computer 603. Computer 603 is in communication with output 605.

In operation, CPE-based converter 109 receives a voice mail message from a voice mail system 106 to input 601.

Communication between input 601 and voice mail system 106 may be facilitated by certain entries made by the subscriber using subscriber telephone 124. Input 601 routes the voice mail message to converter 602. Converter 602 acts to convert the audible voice mail message to a certain audio file (e.g., .wav file), and/or text-based file. Converter 602 then provides the converted data file to computer 603.

Computer 603 conducts a lookup in database 604. Database 604 is populated with data tables that correlate the originating network address of the voice mail message (e.g., telephone number and/or voice mail box for subscriber telephone 124) to another network identifier appropriate for data network 108 (e.g., an email address assigned to subscriber PC 114). Once computer 603 uses database 604 to correlate the voice mail message with the appropriate network address, computer 603 transfers the data file and the destination address to data network 108 via output 605. Alternatively, or in addition, computer 603 may transfer the data file directly to subscriber PC 114. As a result, the subscriber has access to an audio or text-based version of the voice mail message that was received to voice mail system 106, using subscriber PC 114. The subscriber is thus able to sort, categorize, and organize the data file. In addition, the subscriber may be able to re-forward the data file to other parties that may be interested in the voice mail message, for example, by forwarding the data file as an attachment to an email message.

The invention is directed to a system and method for transferring a voice mail message. The invention was described in the context of wired voice and data communication system, but is not so limited to, regardless of any specific description in the drawing or examples set forth herein. For example, the invention may be applied to wireless networks, as well as non-traditional networks like Voice-over-IP-based networks. Also, the invention was described in the context of transferring a voice mail to an email system, but is not so limited. For example, the invention contemplates transferring a voice mail message on a data network in any form (e.g., an html link, an audio file, a data file with directory instructions) to any type of system (e.g., a hard drive associated with an Internet protocol address). Also, the methods described are not limited to any specific components described herein. Instead, the methods may be performed by any existing or new component within a telecommunication system.

It will be understood that the invention is not limited to use of any of the particular components or devices herein. Indeed, this invention can be used in any application that requires the transfer of a voice mail message. Further, the system disclosed in the invention can be used with the method of the invention or a variety of other applications.

While the invention has been particularly shown and described with reference to the embodiments thereof, it will be understood by those skilled in the art that the invention is not limited to the embodiments specifically disclosed herein. Those skilled in the art will appreciate that various changes and adaptations of the invention may be made in the form and details of these embodiments without departing from the true spirit and scope of the invention as defined by the following claims.

What is claimed is:

1. A method of transferring a voice mail message to an email system, comprising:

calling a voice mail system from a subscriber to retrieve a voice mail message related to a telephone number;

calling a gateway device from said subscriber and providing an identifier;

retrieving the voice mail message from the voice mail system;

recording said retrieved voice mail using said gateway device selecting an option to forward said retrieved voice mail message to an email system;

forwarding said retrieved voice mail message to said email system; and receiving a data file via said email system, wherein said data file is representative of said retrieved voice mail message.

2. The method of claim 1, further comprising accessing said voice mailbox.

3. The method of claim 2, wherein providing said accessing comprises receiving an alphanumeric password.

4. The method of claim 1, wherein said option is selected by at least one of the following: depressing a key on a telephone keypad, depressing a key on a computer keyboard, and providing an audible command.

5. The method of claim 1, further comprising identifying at least one email address on said email system to be correlated with said voice mailbox.

6. The method of claim 5, further comprising selecting said at least one email address from a plurality of identified email addresses.

7. The method of claim 1, wherein said data file is at least one of the following: an instant message, an Internet relay chat message, a desktop icon, a hypertext markup language link, and an electronic file with a directory mapping.

8. The method of claim 1, wherein said data file includes at least one of the following: a name of a party initiating the voice mail message, a telephone number of a party initiating the voice mail message, a time and a date of the voice mail message, and a duration of the voice mail message.

9. The method of claim 1, further comprising storing said retrieved voice mail message on a computer-readable medium associated with said email system.

10. A method of transferring a voice mail message to an email system, comprising:

calling a voice mail system from a subscriber to retrieve a voice mail message related to a telephone number;

calling a gateway device from said subscriber and providing an identifier receiving a request to retrieve the voice mail message from the voice mail system recording said retrieved voice mail message using said gateway device prompting a user for a transfer of said retrieved voice mail message to an email system; and transferring said retrieved voice mail message to said email system.

11. The method of claim 10, further comprising converting said retrieved voice mail message to an email.

12. The method of claim 10, further comprising prompting a user for at least one email address associated with said telephone number.

13. The method of claim 10, further comprising storing said retrieved voice mail message on a computer-readable medium associated with said email system.

14. A method of transferring a voice mail message, comprising:

calling a voice mail system from a subscriber to retrieve a voice mail message related to a telephone number;

calling a gateway device from said subscriber and providing an identifier;

receiving a request to retrieve the voice mail message from the voice mail system, wherein said retrieved voice mail message is associated with the identifier converting said retrieved voice mail message to a data file;

correlating said identifier to a network address;

selecting an option to forward said retrieved voice mail message to said network address; and forwarding said data file to said network address.

15. The method of claim 14, further comprising receiving at least one network address associated with said identifier.

16. The method of claim 14, further comprising storing said data file on a computer-readable medium associated with said network address.

17. The method of claim 14, further comprising providing access to said retrieved voice mail message.

18. The method of claim 17, wherein providing said access comprises receiving an alphanumeric password.

19. The method of claim 14, wherein said identifier is at least one of the following: a telephone number, a private branch exchange number, and a subscriber name.

20. The method of claim 14, wherein said network address is at least one of the following: an email address, an Internet relay chat address, an Internet protocol address, and a telephone number.

21. The method of claim 14, wherein said retrieved voice mail message is a part of a voice mail system.

22. The method of claim 14, wherein said data file is sent to said network identifier as at least one of the following: an instant message, an Internet relay chat message, a desktop icon, a hypertext markup language link, and an electronic file with a directory mapping.

23. The method of claim 14, wherein said data file comprises an audible representation of said retrieved voice mail message.

24. The method of claim 14, wherein said data file includes at least one of the following: a name of a party initiating the voice mail message, a telephone number of a party initiating the voice mail message, a time and a date of the voice mail message, and a duration of the voice mail message.

25. A system for transferring a voice mail message, comprising:

a voice mail system having a voice mailbox for voice mail messages;

wherein the voice mail system retrieves a voice mail message related to a telephone number and provides the voice mail message to a subscriber who calls the voice mail system a service control point in communication with said voice mailbox, wherein said service control point prompts the subscriber to transfer the retrieved voice mail message; and a gateway in communication with said service control point, wherein the subscriber calls said gateway wherein said gateway correlates said voice mailbox to a network identifier and records said retrieved voice mail message, and wherein said service control point transfers said voice mail message to said network identifier.

26. The system of claim 25, wherein said gateway is a computer telephony interface.

27. The system of claim 25, wherein said gateway converts said voice mail message to a data file.

28. The system of claim 27, wherein said data file is at least one of the following: an instant message, an Internet relay chat message, a desktop icon, a hypertext markup language link, and an electronic file with a directory mapping.

29. The system of claim 27, wherein said data file comprises an audible representation of said voice mail message.

30. The system of claim 27, wherein said data file includes at least one of the following: a name of a party initiating the voice mail message, a telephone number of a party initiating the voice mail message, a time and a date of the voice mail message, and a duration of the voice mail message.

31. The system of claim 25, further comprising a service switching point in communication with said service control point and in communication with a data network, wherein said service switching point forwards said voice mail message to said network identifier on said data network.

32. The system of claim 31, further comprising a network device in communication with said data network, wherein said network device receives said voice mail message.

33. The system of claim 32, wherein said network device has a network identifier that includes at least one of the following: an email address, an Internet relay chat address, an Internet protocol address, and a telephone number.

34. The system of claim 25, wherein said voice mailbox is identified by at least one of the following: a telephone number, a private branch exchange number, and a subscriber name.

35. A method of transferring a voice mail message to an email message, comprising:

calling a voice mail system from a subscriber to retrieve a voice mail message related to a telephone number;

calling a gateway device from said subscriber and providing an identifier;

playing said retrieved voice mail message;

recording said retrieved voice mail message using said gateway device;

correlating said telephone number to at least one email address;

selecting an option to forward said retrieved voice mail message to said email address; and forwarding said retrieved voice mail message to said email address.

36. The method of claim 35, further comprising converting said retrieved voice mail message to a data file.

37. The method of claim 36, wherein said data file is at least one of the following: an instant message, an Internet relay chat message, a desktop icon, a hypertext markup language link, and an electronic file with a directory mapping.

38. The method of claim 36, wherein said data file includes at least one of the following: a name of a party initiating the voice mail message, a telephone number of a party initiating the voice mail message, a time and a date of the voice mail message, and a duration of the voice mail message.

39. The method of claim 35, further comprising storing said retrieved voice mail message on a computer-readable medium associated with said email address.

* * * * *